Patented Dec. 29, 1925.

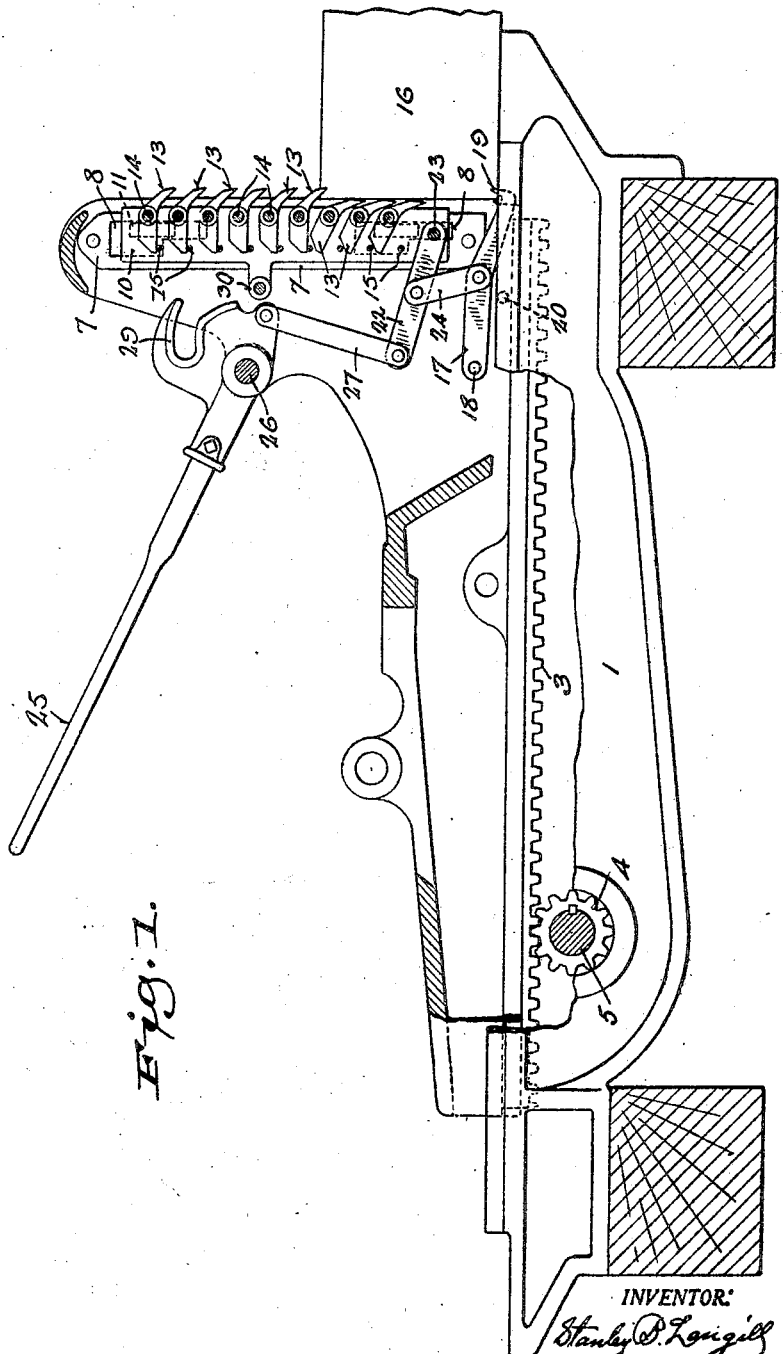

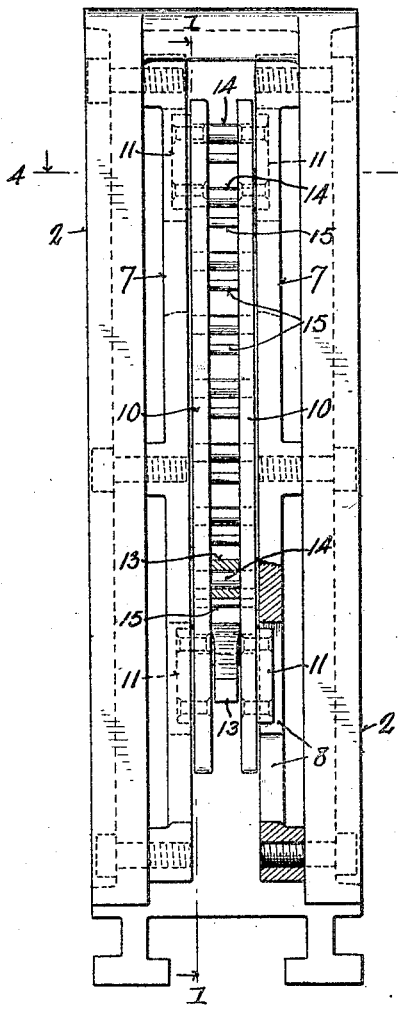

1,567,518

UNITED STATES PATENT OFFICE.

STANLEY B. LANGILL, OF MENOMINEE, MICHIGAN, ASSIGNOR TO THE PRESCOTT COMPANY, OF MENOMINEE, MICHIGAN, A CORPORATION OF MICHIGAN.

SAWMILL DOG.

Application filed September 7, 1922. Serial No. 586,658.

*To all whom it may concern:*

Be it known that I, STANLEY B. LANGILL, a citizen of the United States, residing at Menominee, in the county of Menominee and State of Michigan, have invented certain new and useful Improvements in a Sawmill Dog, of which the following is a specification, reference being had to the accompanying drawing, forming a part thereof.

The main objects of this invention are to prevent defacing or marring the sawed faces of lumber in the operation of dogging; to avoid breaking the dog teeth in turning and placing the lumber or timber to be sawed on the head blocks in position against the knees; and generally to improve the construction and operation of sawmill dogs, particularly for sawing boards or planks.

It consists in the construction, arrangement and combination of parts as hereinafter particularly described and pointed out in the claims.

In the accompanying drawing like characters designate the same parts in the several figures.

Figure 1 is a vertical section on the line 1—1, Figs. 3 and 4, of a sawmill dog embodying the invention as applied to a head block and knees or standard of typical construction, showing the dog engaging a piece of timber; Fig. 2 is a similar view showing the dog teeth withdrawn into inoperative position; Fg. 3 is an enlarged front elevation of the dog and the knee to which it is applied; and Fig. 4 is a cross section on the line 4—4, Figs. 2 and 3.

Referring to Figs. 1 and 2, 1 designates a head block of a sawmill carriage, and 2 a knee or standard mounted thereon and provided with means for moving it on the head block towards and from the plane of the saw, as for example, a rack 3 on the base of the knee and a pinion 4 mounted on a set shaft 5 in mesh with the rack.

All of the foregoing parts may be of the usual or any suitable construction for the purpose, except that the knee or standard 2 is preferably recessed or constructed as shown to receive the dog between its upright sides adjacent its front face.

The dog constituting the present invention comprises two guide plates 7, which are bolted or otherwise attached to the opposing inner faces of the knee parallel with each other. The plates 7 are formed adjacent their upper and lower ends with vertically disposed slots or openings 8, which are widened or offset rearwardly adjacent their upper ends. The slots or openings 8 are substantially L-shape. Between the guide plates 7 a tooth frame, consisting of two parallel plates 10, is freely fitted and guided by blocks or projections 11, riveted or otherwise fastened to their outer sides in engagement with the slots or openings 8. The blocks or projections 11 correspond in width with the lower narrower ends of the slots 8 in which they are guided vertically, and in length with the upper wider or offset ends of the slots in which they are guided horizontally.

Between the frame plates 10 a vertical series of downwardly working and counterweighted teeth 13, are pivotally mounted on pins 14 connecting the plates with each other. The rearwardly extending counterweighted ends of the teeth 13 are normally supported by stops consisting of pins 15, fastened in the plates 10 and extending across the space between them. The pointed ends of the teeth are inclined downwardly, and their points are located below the pivot pins 14 on which they are mounted, so that when the tooth frame is shifted forward, as shown in Fig. 1, to carry the teeth into operative position with their points protruding from the front face of the knee, all the teeth below the upper side of a piece of timber, as 16, placed on the head blocks against the knees will be turned downward and backward into the knee by engagement with the timber; and will not mar or deface it.

An arm or lever 17, fulcrumed at its rear end on a pin 18 between the sides of the knee 2, is formed or provided at its front end with an upwardly working tooth 19, movable up and down into and out of operative position above the top of the head block. A stop consisting of a pin 20, fastened in the knee and extending across the space between its sides, limits the downward movement of the toothed lever 17.

A floating lever 22, pivoted at its front end on a cross pin 23 between the tooth frame plates 10, is connected between its ends by a link 24 with the toothed lever 17. A hand or operating lever 25, fulcrumed on a cross pin 26 between the sides of the standard 2 behind the tooth frame, is connected by a link 27 with the rear end of the floating lever 22.

The socket or shank of the lever 25 is formed or provided with a cam hook 29, adapted by engagement with a roller 30 journaled on a pin between rearwardly projecting arms on the frame plates 10, to shift the tooth frame forward and to advance the points of the teeth 13 into operative position beyond the front face of the knee when said lever is turned backward and downward from the position in which it is shown in Fig. 2, and after the tooth frame with the teeth 13 has been elevated to its upper position, to shift said frame backward and carry the points of the teeth into inoperative position behind the front face of the knee when the operating lever is turned upward and forward from the position shown in Fig. 1 to the position shown in Fig. 2. The operating lever 25 thereby effects vertical and horizontal movements, successively, of the tooth frame with respect to the knee.

In the operation of the dog, a piece of timber such as 16, being placed on the head blocks 1 against the knees 2 in position for dogging and sawing, as shown in Fig. 2, the lever 25 is swung backward and downward, and during its initial movement the tooth frame with the teeth 13 is thrust forward by the action of the cam hook 29 on the roller 30, until the blocks or plates 11 are carried out of the rearwardly widened or extended upper ends of the slots against the front sides thereof, and the cam hook clears the roller. The points of the teeth 13 above the timber 16 are thus projected from the knee into operative position, while the points of the teeth below the top of the timber are turned backward into the knee by engagement with the timber, as shown in Fig. 1.

The continued backward and downward movement of the lever 25 carries the tooth frame with the teeth 13 downward until the next tooth above the timber engages the upper side thereof, whereupon through the lever and link connections 17, 24, 22 and 27, the tooth 19 is moved up into engagement with the lower side of the timber, the pressure applied to the operating lever being then exerted equally and in opposite directions on the two teeth to force them into firm engagement with the timber.

To release the timber or last board held by the dog, the lever 25 is turned upward and forward from the position in which it is shown in Fig. 1, to the position shown in Fig. 2. By its initial movement in this direction, the tooth 19 is disengaged from the timber and falls below the top of the head block into engagement with the stop pin 20. Continued movement of the lever 25 acting through the link 27 and floating lever 22, lifts the tooth frame with the teeth 13 straight upward, till the blocks or plates 11 are opposite the offset or enlarged upper ends of the slots 8, whereupon the further movement of the lever 25 in the same direction, carries the cam hook 29 into engagement with the roller 30 and shifts the tooth frame backward, withdrawing the teeth 13 into the knee behind its front face, as shown in Fig. 2, where they are protected against breakage or injury by heavy timber striking them when it is turned or placed in position on the head blocks against the knees.

Various changes in the details of construction and arrangement of parts of the dogs and of the knees to which they are applied, may be made without departure from the principle and scope of the invention as defined in the following claims.

I claim:

1. In a sawmill dog, in combination, a knee, a tooth frame fitted to said knee for vertical and horizontal movements with respect thereto, one of said parts being provided with a projection, the other of said parts being provided with a substantially L-shape opening to receive said projection to permit vertical and horizontal movements of said tooth frame with respect to said knee, and means cooperating with said knee and said tooth frame to effect movement of said tooth frame with respect to said knee.

2. In a sawmill dog, in combination, a knee, a tooth frame fitted to said knee for vertical and horizontal movements with respect thereto, one of said parts being provided with a projection, the other of said parts being provided with a substantially L-shape opening to receive said projection to permit vertical and horizontal movements of said tooth frame with respect to said knee, and an operating lever connected for cooperation with said parts to effect successively vertical and horizontal movements of said tooth frame with respect to said knee.

3. In a sawmill dog the combination with a knee provided with vertical guide slots having rearward enlargements adjacent their upper ends, a tooth frame having projections on opposite sides thereof movable up and down in said slots and forward and backward in the upper parts thereof, teeth pivotally mounted in said frame and movable therewith and independently thereof and of one another into and out of operative position with their points protruding from the knee, and a lever connected with and adapted to shift the tooth frame up and down and backward and forward.

4. In a sawmill dog the combination with a knee, of a tooth frame guided and movable up and down and backward and forward in the frame, teeth pivotally mounted in said frame and movable independently of one another into and out of operative position, means tending to hold the teeth in operative position, a tooth pivoted to the knee below the other teeth and movable into and out of operative position above the base of the knee, a floating lever connected at one end with the tooth frame and between its ends by a link with the lower tooth, and an operating lever connected by a link with the other end of the floating lever and provided with a cam hook adapted by engagement with the tooth frame in its upper position to shift it forward and backward.

5. In a sawmill dog the combination with a knee, of a tooth frame guided in said knee for movement with respect thereto in two different directions, counterweighted teeth pivotally mounted in said frame and having their points inclined downwardly below their pivots, and adapted to be thrust backward into the knee by engagement with timber in contact with the knee, stops normally supporting the counterweighted ends of the teeth with the points in operative position, and a lever adapted to effect movement of said frame in said two different directions.

6. In a sawmill dog the combination with a head block and a knee movably mounted thereon, of a tooth frame guided and movable up and down and backward and forward in the knee, downwardly working teeth pivotally mounted in said frame and movable bodily therewith and individually on their pivots into the knee out of operative position, an upwardly working tooth pivotally connected with the knee and movable up and down into and out of operative position above the top of the head block, and a lever connected with the tooth frame and with the lower tooth and adapted to simultaneously shift them towards or from each other and to shift the tooth frame in its upper position forward or backward.

7. In a sawmill dog the combination with a head block and a knee movably mounted thereon, of a tooth frame guided and movable up and down and in its upper position forward and backward in the knee, counterweighted teeth pivotally mounted in said frame and having downwardly inclined points movable with said frame and individually on their pivots out of operative position in front of the knee, stops cooperating with the counterweighted ends of the teeth to hold the points of the teeth normally in working position, a lever fulcrumed in the knee and having a tooth movable up and down into and out of operative position above the top of the head block, a stop for limiting the downward movement of said toothed lever, a floating lever connected by a link between its ends with the toothed lever and at one end with the tooth frame, an operating lever fulcrumed on the knee and connected by a link with the other end of the floating lever, and a cam hook attached to the operating lever and adapted by engagement with a part of the tooth frame in its upper position to shift it forward or backward and carry the points of the pivoted teeth into or out of operative position in advance of the front face of the knee.

8. In a sawmill dog, in combination, a knee, a tooth frame fitted to said knee for vertical and horizontal movements with respect thereto, and an operating lever connected for cooperation with said parts to effect successively vertical and horizontal movements of said tooth frame with respect to said knee.

9. In a sawmill dog, in combination, a knee, a tooth frame fitted to said knee for movement with respect thereto, and a lever mounted to one of said parts for movement with respect thereto, said lever and the other of said parts being provided with means arranged for engagement to effect movement of said frame with respect to said knee, said means comprising a cam hook and a pin.

10. In a sawmill dog, in combination, a knee, a tooth frame fitted to said knee for forward and backward movement with respect thereto, and a lever pivotally connected to said knee, said lever being provided with a cam, said frame being provided with means to co-operate with said cam to effect said movement of said frame with respect to said knee upon movement of said lever.

11. In a sawmill dog, in combination, a knee, a tooth frame fitted to said knee for movement with respect thereto, a lever pivotally mounted to said knee, and connections between said lever and said frame to cause movement of said frame with respect to said knee upon movement of said lever, said connections comprising a link and a second lever.

12. In a sawmill dog, in combination, a knee, a tooth frame fitted to said knee for vertical and horizontal movements with respect thereto, a lever pivotally mounted to said knee, connections between said lever and said frame to effect vertical movement of said frame upon movement of said lever, said connections comprising a link and a second lever, and means arranged for engagement to effect horizontal movement of said frame upon movement of said lever, said means comprising a cam and a pin.

13. In a sawmill dog, in combination, a knee, a tooth frame fitted to said knee for vertical and horizontal movements with respect thereto, a lever pivotally mounted to said knee, and connections between said lever and said frame to effect vertical movements of said frame upon movement of said lever, said connections comprising a link and a second lever, said first mentioned lever being provided with a cam hook, said tooth frame being provided with a pin arranged for cooperation with said cam hook to effect horizontal movement of said frame upon movement of said lever.

In witness whereof I hereto affix my signature.

STANLEY B. LANGILL.